US012348007B2

(12) United States Patent
Schaefer

(10) Patent No.: US 12,348,007 B2
(45) Date of Patent: Jul. 1, 2025

(54) SPARK PLUG

(71) Applicant: Caterpillar Energy Solutions GmbH, Mannheim (DE)

(72) Inventor: Friedrich Schaefer, Edenkoben (DE)

(73) Assignee: CATERPILLAR ENERGY SOLUTIONS GmbH, Mannheim (DE)

( * ) Notice: Subject to any disclaimer, the term of this patent is extended or adjusted under 35 U.S.C. 154(b) by 0 days.

(21) Appl. No.: 18/577,845

(22) PCT Filed: Jun. 30, 2022

(86) PCT No.: PCT/EP2022/025303

§ 371 (c)(1),
(2) Date: Jan. 9, 2024

(87) PCT Pub. No.: WO2023/280437

PCT Pub. Date: Jan. 12, 2023

(65) Prior Publication Data

US 2024/0356311 A1 Oct. 24, 2024

(30) Foreign Application Priority Data

Jul. 9, 2021 (GB) ...................................... 2109963

(51) Int. Cl.
*H01T 13/16* (2006.01)
*H01T 13/36* (2006.01)

(52) U.S. Cl.
CPC ............. *H01T 13/16* (2013.01); *H01T 13/36* (2013.01)

(58) Field of Classification Search
CPC ................................ H01T 13/16; H01T 13/36
See application file for complete search history.

(56) References Cited

U.S. PATENT DOCUMENTS 2,680,432 A * 6/1954 Rand ........................ H01T 13/16 313/11.5
4,810,929 A * 3/1989 Strumbos ................ H01T 13/16 313/11.5
6,548,944 B1 * 4/2003 Morita .................... H01T 13/38 313/143
6,759,796 B2 7/2004 Klett et al.
7,944,135 B2 5/2011 Walker, Jr.
8,633,640 B2 1/2014 Kyuno et al.
(Continued)

FOREIGN PATENT DOCUMENTS

DE 4017650 A1 6/1991
DE 102016203465 A1 9/2017
(Continued)

OTHER PUBLICATIONS

Great Britain Search Report related to Application No. GB2109963.5; reported on Dec. 10, 2021.
(Continued)

*Primary Examiner* — Evan P Dzierzynski
*Assistant Examiner* — Nathaniel J Lee

(57) ABSTRACT

The present invention pertains to a spark plug comprising a housing, an insulator for electrically insulating a center electrode provided at least partly on the inside of the insulator. The housing of the spark plug is configured such that in a mounted state, an annular gap is formed between the housing and the insulator. The annular gap is filled with a heat-conducting element.

15 Claims, 2 Drawing Sheets

(56) References Cited

U.S. PATENT DOCUMENTS

| | | | | |
|---|---|---|---|---|
| 2011/0139107 | A1* | 6/2011 | Burrows | H01T 13/20 123/169 PA |
| 2011/0254428 | A1* | 10/2011 | Kyuno | H01T 13/16 313/135 |
| 2020/0412104 | A1 | 12/2020 | Saito et al. | |

FOREIGN PATENT DOCUMENTS

| | | | |
|---|---|---|---|
| EP | 1098404 | A1 | 5/2001 |
| EP | 2383847 | A1 | 11/2011 |
| FR | 3035748 | A1 | 11/2016 |
| JP | 0227680 | A | 1/1990 |
| JP | 2021015757 | A | 2/2021 |
| WO | 9000821 | A1 | 1/1990 |
| WO | 2007057239 | A1 | 5/2007 |

OTHER PUBLICATIONS

International Search Report related to Application No. PCT/EP2022/025303; reported on Oct. 14, 2022.

* cited by examiner

SPARK PLUG

CROSS-REFERENCE TO RELATED APPLICATION

This application is a USC § 371 US National Stage filing International Application No. PCT/EP2022/025303 filed on Jun. 30, 2022 which claims priority under the Paris Convention to Great Britain Patent Application 2109963.5 filed on Jul. 9, 2021.

TECHNICAL FIELD

The present invention pertains to a spark plug comprising a housing, an insulator for electrical insulating a center electrode provided at least partly on the inside of the insulator. The present disclosure also pertains to an engine comprising a spark plug.

TECHNOLOGICAL BACKGROUND

Being directly exposed to the combustion site, a center electrode of a spark plug can reach temperatures of more than 800° C. Inherently, heat-damaged center electrodes of spark plugs remain one of the main reasons for spark plug failure. Signs of heat-damage include burned blisters on the center electrode's tip, melted electrodes and/or oxidation deposits, which may cause engine overheat, incorrect spark plug heat ranges, loose spark plugs, incorrect ignition timing or improper air/fuel mixtures.

In order to prolong the life-span of spark plugs, extensive research and development efforts had been directed towards the development of high temperature resistant center electrode materials, including Ir (iridium) or Pt (platinum) center electrodes or coatings made for center electrodes. However, high-temperature oxidation, melting or blisters can still occur utilizing such advanced materials. In particular, composite materials may have an increased failure probability due to different thermal expansion factors of the individual components of the composite.

It is widely accepted that actively cooling the center electrode conflicts with the necessity of electrically insulating the center electrode from the surrounding spark plug housing. Electrical insulators, usually made of ceramic materials, are integrated into steel housings such that a gap between electrical insulator and the housing is provided. Thereby, the risk of electrical breakdowns can be reduced. Also, material-inherent manufacturing limitations, the heat expansion and the brittleness of ceramic make it necessary to provide a gap between the housing and the electrical insulator. However, the thermal insulation provided by the annular gap is promoting high temperatures in center electrode and therefore has a detrimental effect on the life-span of a spark plug.

The spark plug of the present disclosure solves one or more problems set forth above.

SUMMARY OF THE INVENTION

Starting from the prior art, it is an objective to provide a simple, cost-effective and reliable spark plug having an improved temperature resistance.

This objective is solved by means of a spark plug with the features of claim 1. Preferred embodiments are set forth in the present specification, the Figures as well as the dependent claims.

Accordingly, a spark plug is provided, comprising a housing, an insulator for electrically insulating a center electrode provided at least partly on the inside of the insulator. The housing of the spark plug is configured such that in a mounted state, and annular gap is formed between the housing and the insulator. The annular gap is filled with a heat-conducting element.

Furthermore, and engine is provided comprising such a spark plug.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
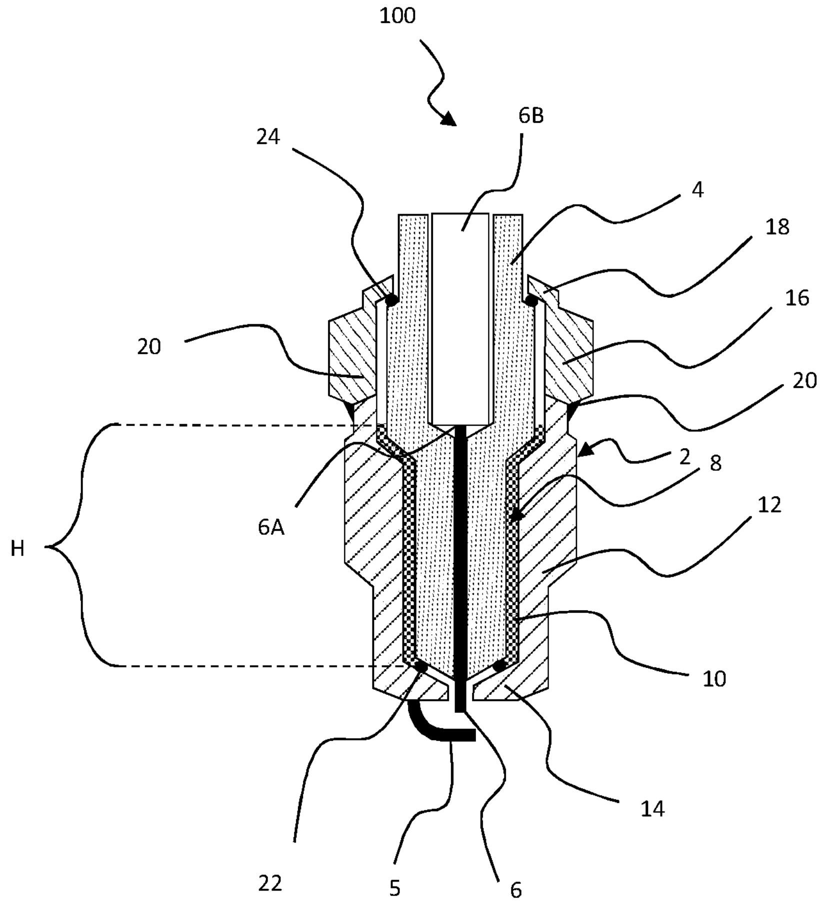
FIG. 1 schematically discloses a spark plug according to an embodiment in a partial, cross-sectional view.

In the following, the invention will be explained in more detail with reference to the accompanying figures. In the Figures, like elements are denoted by identical reference numerals and repeated description thereof may be omitted in order to avoid redundancies.

FIG. 1 schematically shows a spark plug 100 in a cross-sectional view. The shown spark plug 100 is illustrated only partly and in a simplified manner. In particular, various upper parts of the spark plug 100 are not depicted. The spark plug 100 shown in FIG. 1 comprises a housing 2 and an electrical insulator 4 for electrically insulating a center electrode 6 provided at least partly on the inside of the electrical insulator 4. The housing 2 of the spark plug 100 is configured such that in a mounted state of the spark plug 100, an annular gap 8 is formed between the housing 2 and the electrical insulator 4. The annular gap 8 is filled with a heat-conducting element 10. In the shown embodiment, the annular gap 8 may have a ring-shaped cross-section. To this end, the center electrode 6, the electrical insulator 4 and the housing 2 may be mounted substantially concentrically. The material of the electrical insulator 4 may comprise aluminum oxide $Al_2O_3$.

The center electrode 6 may be configured such that it can be supplied with electrical energy via an inductive coil (not shown in FIG. 1) to produce a spark in a gap formed between the center electrode 6 and a ground electrode 5. The center electrode 6 may comprise a steel alloy, in particular Inconel, and/or other alloy components. Additionally, the center electrode 6 may comprise a coating, layer or pellet comprising iridium, platinum or a further high-temperature resistant metal. The center electrode 6 may comprise a stepped portion 6A, at which a core portion 6B of the center electrode 6 may be comprised. The core portion 6B may be used as an electrical resistance.

According to the embodiment shown in FIG. 1, the housing 2 may further comprise a tube portion 12 having an inward-facing tube abutment 14 and a lid portion 16 having an inward-facing lid abutment 18. The housing 2 may be configured such that in a mounted state, the insulator 4 is fixedly mounted between the inward-facing tube abutment 14 and the inward-facing lid abutment 18. More specifically, the tube-portion 12 and the lid portion 16 may be configured such that in a mounted state, the insulator 4 may be held in place by the inward-facing tube abutment 14 and the inward-facing lid abutment 18. To this end, at least the center electrode 6 may reach through, or beyond, the inward-facing tube abutment 14. Likewise, at least the insulator 4 may reach through, or beyond, the inward-facing lid abutment 18.

Further, the tube portion 12 and the lid portion 16 may comprise a welded joint 20 via which the tube portion 12 and the lid portion 16 may be welded together. The welded joint 20 may be a laser-welded joint.

The spark plug 100 may further comprise a tube seal ring 22 between the inward-facing tube abutment 14 and the electrical insulator 4. The tube seal ring 22 may comprise a high temperature resistant material comprising carbon and/or metal. The spark plug 100 may further comprise a lid seal ring 24 between the inward-facing lid abutment 16 and the electrical insulator 4. More specifically, the tube-portion 12 and the lid portion 16 may be configured such that in a mounted state, the electrical insulator 4 may be held in place by tube seal ring 22 provided between the inward-facing tube abutment 14 and the insulator and by a lid seal ring 24 provided between the inward-facing lid abutment 18 and the electrical insulator 4.

According to the embodiment shown in FIG. 1, the annular gap 8 may be confined on its lowermost point by the tube seal ring 22 and on its uppermost point by the lid seal ring 24.

The heat-conducting element 10 may be configured such that it may extend to a lowermost point of the annular gap 8. Accordingly, the heat-conducting element 10 may be configured such that it may extend to the tube seal ring 22, which may be provided between the inward-facing tube abutment 18 and the electrical insulator 4. Thereby, the annular gap 8 may be filled with a heat-conducting element 10 from above through the inward-facing tube abutment 18.

According to the embodiment shown in FIG. 1, the heat-conducting element 10 may extend from the lowermost point of the annular gap 8 to a filling height H corresponding to a stepped portion 6A of the center electrode 6. In other words, the heat-conducting element 10 may extend from the lowermost point of the annular gap 8 to a filling height H corresponding to the height of the stepped portion 6A of the center electrode 6 within the electrical insulator 4.

The heat-conducting element 2 may substantially come into a full surface contact with those parts of the housing 2 and the electrical insulator 4 that are adjacent to the heat-conducting element 10.

The heat-conducting element 10 may comprise a liquid comprising an oil, a heat-conducting paste or a liquid metal. If an oil is comprised, the oil may comprise a silicon oil, lubrication oil and/or engine oil. If a liquid metal is comprised, liquid metal may comprise a liquid metal which is configured such that it is liquid at room temperature, in particular an alloy of indium, Gallium-indium-tin (GIT). To this end, the electrical insulator 4 may comprise a ceramic having a coating, suitable for preventing the heat-conducting element 10 from diffusing or flowing into the ceramic. For example, if gallium-indium-tin (GIT) is utilized, the electrical insulator 4 may comprise a ceramic having a low enough porosity such that Gallium-indium-tin (GIT) is not permeating into the electrical insulator 4.

Alternatively, the heat-conducting element 10 may comprise a solid structure, a granular material, a solar or a powder. To this end, the powder may comprise metal, ceramic and/or polymer particles. Further, the solid structure may comprise a block, a cylinder, a sphere, a pyramid or a combination thereof, and/or an elastic component in the shape of a leaf spring, a coil spring and/or a mesh. Further, the solid structure may comprise a multitude of said shapes for example in the form of a bulk material.

The heat-conducting element 10 may have electrically insulating properties defined such, that the overall electrical insulation capacity of the spark plug 100 including the heat-conducting element 10 may for example not be lower than an electrical insulation capacity of a spark plug 100 comprising an empty annular gap 8.

Figure 2:
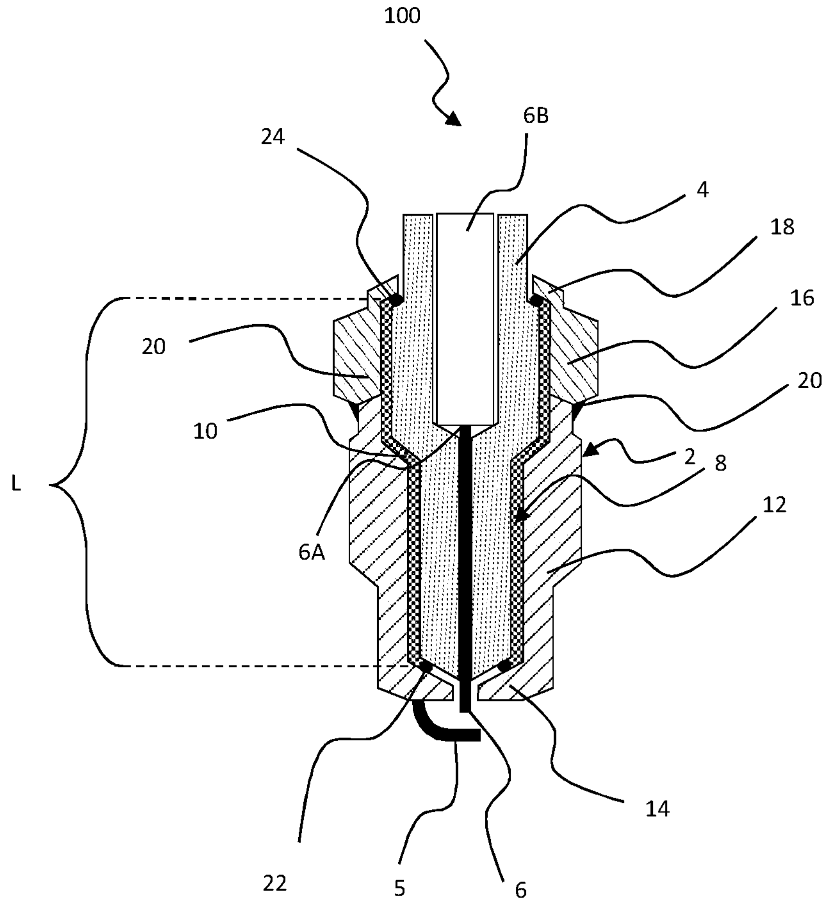
FIG. 2 schematically discloses a spark plug according to another embodiment in a partial, cross-sectional view.

FIG. 2 discloses a spark plug 100 according to another embodiment. Apart from the filling height of the heat-conducting material 10, all further features of the spark plug 100 discussed in the context of FIG. 1 also apply to the embodiment shown in FIG. 2.

According to the embodiment shown in FIG. 2, the heat-conducting element 10 may be configured such that it extends substantially over an entire length L of the annular gap 8. To this end, according to the embodiment shown in FIG. 2, the heat-conducting element 10 may substantially extend from the tube seal ring 22 to the lid seal ring 24.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and all features mentioned before in any technically feasible combination. As an example, a spark plug may have more than one heat-conducting element within the annular gap. Further, a spark plug may have more than one annular gap with or without a heat-conducting element filled therein.

A spark plug may be provided, comprising an insulator for electrically insulating a center electrode provided at least partly on the inside of the insulator, wherein the housing is configured such that in a mounted state, an annular gap is formed between the housing and the insulator. The annular gap may be filled with a heat-conducting element.

During operation of a spark plug, heat is inflicted its lowermost end by the adjacent combustion site, heating a lower end of the center electrode via conduction and radiation heat transfer phenomena. Subsequently, heat is transferred further into the core of the center electrode and the electrical insulator.

By providing an annular gap filled with a heat-conducting element, a conductive heat transfer over the annular gap can be established via those parts of the surface are of the insulator that are in physical contact with the heat-conducting element. Effectively, the heat-transfer element itself and the further components in physical contact with the heat-transfer elements may then act as a heat-sink. Thereby, an efficient heat transfer from the electrical insulator to the housing may be established. In this respect, it has been proved that the advantages of being able to transport heat out of the electrical insulator vastly outweigh the reduction in electrical insulation provided by an annular gap in the form of an air gap.

To this end, the life-span of the center electrode may be increased substantially for several reasons. The maximum temperature reached by the center electrode may be reduced due to an enhanced heat transfer out of the center electrode. If iridium is comprised in the center electrode, high temperature induced oxidation may be reduced or avoided. Further, if platinum is comprised in the center electrode, platinum melting may be reduced or avoided. In general, if the center electrode comprises a composite of materials, the risk of peeling off, blister forming and/or cracks may be reduced due to the reduced heat load. For metal materials comprised in the center electrode, the risk of burning may be reduced. An annular gap, filled with a heat-conducting element has the advantage that the electrical conductivity of the center electrode is not reduced while at the same time the heat load of the center electrode may be reduced.

In the context of the present disclosure, the term heat-conducting element may refer to an element having a thermal conductivity of at least 1 W/(m·K).

According to a preferred embodiment, the heat-conducting element may be configured such that it extends to a lowermost or uppermost point of the annular gap. In the context of the present disclosure, the lowermost point of the annular gap may be a point where the insulator is sealed against and/or held by the housing. By configuring the heat-conducting element such that it extends to a lowermost point of the annular gap, heat may be conducted effectively out of the center electrode and the insulator, because the lower parts of the center electrode and the insulator are usually the hottest parts of the spark plug.

Preferably, the heat-conducting element may be configured such that it extends from the lowermost point of the annular gap to a filling height corresponding to a stepped portion of the center electrode. Usually, the center electrode extends a given length within the electrical insulator. By configuring the heat-conducting element such that it may extend from the lowermost point of the annular gap to a filling height corresponding to a stepped portion of the center electrode, a heat load of the center electrode may be transferred to the outside via the heat-conducting element effectively over a length of the center electrode within the insulator.

In a further embodiment, the heat-conducting element may be configured such that it substantially extends over an entire length of the annular gap. Thereby, a heat load of the electrical insulator may be transferred to the outside via the heat-conducting element along the entire length of the annular gap. Thereby, the heat transfer from the electrical insulator to the housing can be optimized further. In addition, the electrical field over the entire length of the annular gap may be held substantially constant. To this end, having only minor gradients in the electrical field, voltage peaks can be avoided and the insulation capacity of the insulator can be upheld.

In a further embodiment, the heat-conducting element may substantially come into full surface contact with those part of the housing and the insulator that are adjacent the center electrode. Full surface contact, or full physical contact of the heat-conduction element with the adjacent parts of the housing and electrical insulator allows heat transfer by conduction. By coming substantially into full surface contact with those parts of the housing and the insulator that are adjacent to the center electrode, the heat-conducting element may maximize the available surface area participating in the conductive heat transfer. To this end, for a given heat-conducting element, the heat flux from the insulator the housing via heat-conducting element can be maximized. Thereby, the cooling of the center electrode can be maximized, which may lead to lower temperatures during operation and, hence, a prolonged life-span.

According to a further embodiment, the heat-conducting element may substantially come to full surface contact with those parts of the housing and the insulator that are available within the annular gap. Thereby, for a given heat-conducting element, the heat flux from the insulator to the housing via the heat-conducting element can be maximized. Thereby, the cooling of the center electrode can be maximized accordingly.

In the context of the present disclosure, the interpretation of the term "substantially into full surface contact" may consider the filling-characteristics of the heat-conducting element. A heat-conducting element may therefore be considered to come substantially into full surface contact if it is present in a form which may be achieved by filling the heat-into the annular gap. As an example, if the heat-conducting element comprises a liquid, a full surface contact can be understood as a wedding of the respective surfaces. Likewise, if the heat-conducting element is a solid, a full surface contact can be understood as a literal full surface contact. The other hand, if the heat-conducting element comprises a porous or bulk material, a full surface contact may be understood as maximum achievable surface contact that is typical for the corresponding bulk or porous material.

In a further development, the heat-conducting element may comprise a liquid comprising an oil, a heat-conducting paste or a liquid metal. By comprising a liquid, the heat-conducting element may be conveniently filled into the annular gap while at the same time maximizing the available surface area, if a wetting occurs. Utilizing a heat-conducting paste and/or liquid metals has the advantage of a high thermal conductivity while at the same time providing material properties having a high temperature resistance.

According to a further embodiment, the oil may comprise silicon oil, lubrication oil and/or engine oil. Utilizing oil and in particular silicon oil, lubrication oil and/or engine oil, has the advantage of a cheap and readily available material for the heat-conducting element.

According to a further development, the heat-conductive element comprises a liquid, wherein the annular gap and the liquid are configured such that during operation of the spark plug, natural convection may occur. Thereby, heat transfer may be enhanced further due to convective heat transfer in combination with conductive heat transfer. To this end, the center electrode can be cooled effectively, leading to a prolonged life-span.

According to a further embodiment, the insulator may comprise a ceramic having a coating, suitable for preventing the heat-conducting element from diffusing or flowing into the ceramic. In the context of the present disclosure, a coating suitable for preventing the heat-conducting element from diffusing or flowing into the ceramic is to be interpreted under consideration of the utilized heat-conducting element. If for example the heat-conducting element is a liquid, a suitable coating may be configured such that the liquid cannot flow into the ceramic for the given range of expected operation temperatures. Likewise, the term coating can be understood such that chemical diffusion of elements stemming from the heat-conducting element into the insulator may be prevented. By comprising a coating suitable for preventing the heat-conducting element from diffusing or flowing into the ceramic, the insulator may maintain its insulating capacities throughout expected temperature ranges. Thereby, operations safety of the spark plug can be increased.

According to a further development, the heat-conducting element may comprise a solid structure a granular material, a solder or a powder. By comprising a solid structure, the heat-conducting element may be conveniently stored, filled and positioned within the annular gap. Further, by comprising a solid structure, a granular material is solder or a power, potential material candidates may be selected from a great variety of materials having a melting point above the expected temperatures within the annular gap.

According to a further embodiment, the powder may comprise metal, ceramic and/or polymer particles. Thereby, an effective use of the available volume within the annular gap may be achieved. Further, utilizing a suitable powder may comprise phase-change characteristics within the expected temperatures inside of the annular gap. For example, the powder may comprise a powder suitable for a powder metallurgy process. Thereby, a solid yet form-fitting filling of the annular gap may be achieved.

According to a further development, the solid structure may comprise a block, a cylinder, a sphere, a pyramid or a combination thereof, and/or an elastic component in the shape of a leaf spring, a coil spring and/or a mesh. Thereby, suitable shapes may be selected for a given annular gap, allowing to fill the annular gap with solids effective for a conductive heat transport while at the same time providing a structural flexibility to compensate thermal expansion. To this end, said shapes may for example be provided as bulk material.

In a further development, the heat-conducting element may have electrically insulating properties. Thereby, the risk of electrical breakdowns may be reduced.

In a further development, the housing may comprise a tube portion having an inward-facing tube abutment and a lid portion having an inward-facing lid abutment, wherein the housing is configured such that in a mounted state, the insulator is fixedly mounted between the inward-facing tube abutment and the inward-facing lid abutment, preferably wherein the tube portion and the lid portion comprise a welded joint, preferably a laser-welded joint.

By comprising a tube portion having an inward-facing tube abutment and a lid portion having an inward-facing lid abutment, the electrical insulator may conveniently held in place inside of the housing of the spark plug while providing an annular gap between the housing and the electrical insulator. Further, thermal expansion factor differences between the spark plug housing and the electrical insulator may be compensated by the inward-facing tube abutment and inward-facing lid abutment. Further, geometrical imperfections of the electrical insulator may be conveniently compensated by the annular gap.

Because the tube portion and the lid portion may comprise a welded joint, the electrical insulator may be held in place conveniently. Providing the welded joint as a laser-welded joint has the advantage that laser welding only inflicts small amounts of heat energy into the weld. Thereby, the welding may even occur at a stage when the heat-conducting element is already filled in the annular gap.

According to a further development, the spark plug may further comprise a tube seal ring between the inward-facing tube abutment and the insulator, wherein the tube seal ring may comprise a high temperature resistant material comprising carbon and/or metal.

By comprising a tube seal ring, the electrical insulator may be held in place inside of the housing of the spark plug conveniently. By providing the tube seal ring between the inward-facing tube abutment and the insulator, different heat expansions of the electrical insulator and the housing of the spark plug may be compensated by the tube seal ring. Further, the overall length of the annular gap which is available for being filled with the heat-conducting element may be maximized. Finally, by providing the tube seal ring, the annular gap may be gas-tightly sealed.

In a further development, the spark plug may further comprise a lid seal ring between the inward-facing lid abutment and the insulator, preferably wherein the lid seal ring may be transparent.

By providing the lid seal ring between the inward-facing lid abutment and the insulator, different heat expansions of the electrical insulator and the housing of the spark plug may be compensated by the tube seal ring. Further, the overall length of the annular gap which is available for being filled with the heat-conducting element may be maximized. By providing a transparent lid seal ring, the filling status of the heat-conducting element may be monitored conveniently. Finally, by providing the lid seal ring, the annular gap may be gas-tightly sealed.

The tube seal ring and/or the lid seal ring may comprise copper and/or Inconel alloy steel. Preferably, the material of the tube seal ring and the lid seal ring is selected such that a predetermined flexibility of the rings is provided such that a difference in thermal expansion between the housing and the electrical insulator is compensated such that the sealing-function is maintained throughout the entire expected temperature range.

Preferably, the material of the electrical insulator may comprise aluminum oxide $Al_2O_3$, having a high electrical resistivity of 3410 Ω·cm and a low thermal expansion factor. Aluminum oxide is one of the most cost effective and widely used material in the family of engineering ceramics. The raw materials from which this high-performance technical grade ceramic is made are readily available and reasonably priced, resulting in good value for the cost in fabricated alumina shapes.

An engine may be provided comprising a spark plug according to the present disclosure. Thereby, by providing a spark plug comprising a heat-conducting element in the annular gap, maintenance intervals dedicated to spark plug replacements may be prolongated.

INDUSTRIAL APPLICABILITY

With reference to the figures, a spark plug and an engine having a spark plug are provided.

In practice, a spark plug and an engine comprising such a spark plug may be manufactured, bought, or sold to retrofit an engine, or in engine already in the field in an aftermarket context or alternatively may be manufactured, bought, sold or otherwise obtained in an OEM (original equipment manufacturer) context.

As alluded to previously herein, the aforementioned embodiments may increase spark plug lifespan as will be elaborated further herein momentarily.

Referring to FIG. 1, there is an embodiment shown, disclosing a spark plug comprising a heat-conducting element which extends from a lowermost point of the annular gap. One skilled in the art will expect that various embodiments of the present disclosure will have an improved simplicity, necessitating less maintenance and less complex geometries.

The same advantages apply to the remaining FIG. 2, in particular to the spark plug comprising an annular gap which is filled with a heat-conducting element to an entire length of the annular gap and to the engine comprising such a spark plug.

The present description is for illustrative purposes only and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," "include", "includes", "including", or the like are intended to be open-ended terms. Further, the phrase "based on" is intended to mean "based, at least in part, on" unless explicitly stated otherwise.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

Certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A spark plug comprising a housing, an insulator for electrically insulating a center electrode provided at least partly on the inside of the insulator, wherein the housing is configured such that in a mounted state, an annular gap is formed between the housing and the insulator, characterized in that the annular gap is filled with a heat-conducting element proximate a distal end of the insulator where the center electrode extends past the insulator.

2. The spark plug according to claim 1, wherein the heat-conducting element is configured such that it extends to a lowermost point of the annular gap, the heat-conducting element extending from the lowermost point of the annular gap to a filling height corresponding to a stepped portion of the center electrode.

3. The spark plug according to claim 1, wherein the heat-conducting element is configured such that it extends substantially over an entire length of the annular gap.

4. The spark plug according to claim 1, wherein the heat-conducting element comes substantially into full-surface contact with those parts of the housing and the insulator that are adjacent to the heat-conducting element.

5. The spark plug according to claim 1, wherein the heat-conducting element comprises a liquid comprising an oil, a heat-conducting paste or a liquid metal.

6. The spark plug according to claim 5, wherein the oil comprises silicon oil, lubricating oil and/or engine oil.

7. The spark plug according to claim 5, wherein the insulator comprises a ceramic having a coating, suitable for preventing the heat-conducting element from diffusing or flowing into the ceramic.

8. The spark plug according to claim 1, wherein the heat-conducting element comprises a solid structure, a granular material, a solder or a powder.

9. The spark plug according to claim 8, wherein the powder comprises metal, ceramic and/or polymer particles.

10. The spark plug according to claim 8, wherein the solid structure comprises a block, a cylinder, a sphere, a pyramid or a combination thereof, and/or an elastic component in the shape of a leaf spring, a coil spring and/or a mesh.

11. The spark plug according to claim 1, wherein the heat-conducting element has electrically insulating properties.

12. The spark plug according to claim 1, wherein the housing comprises a tube portion having an inward-facing tube abutment and a lid portion having an inward-facing lid abutment, wherein the housing is configured such that in a mounted state, the insulator is fixedly mounted between the inward-facing tube abutment and the inward-facing lid abutment, wherein the tube portion and the lid portion comprise a welded joint.

13. The spark plug according to claim 12, wherein the spark plug further comprises a tube seal ring between the inward-facing tube abutment and the insulator, wherein the tube seal ring comprises a high temperature resistant material comprising carbon and/or metal.

14. The spark plug according to claim 12, wherein the spark plug further comprises a lid seal ring between the inward-facing lid abutment and the insulator, wherein the lid seal ring is transparent.

15. The engine comprising a spark plug according to claim 1.

* * * * *